United States Patent [19]

Van Coffman

[11] 4,239,055
[45] Dec. 16, 1980

[54] PRESSURE PLUG

[76] Inventor: Michael Van Coffman, 1028 "C" St., Olivenhain, Calif. 92024

[21] Appl. No.: 880,632

[22] Filed: Feb. 23, 1978

[51] Int. Cl.² ............................................. F16K 43/00
[52] U.S. Cl. .................................... 137/315; 137/321; 138/89; 138/94; 138/97
[58] Field of Search ........................ 137/315, 318, 321; 138/89, 94, 97

[56] References Cited

U.S. PATENT DOCUMENTS

| 1,850,040 | 3/1932  | Turner ............................... | 138/89  |
| 2,299,365 | 10/1942 | Valuch .............................. | 138/89  |
| 2,763,282 | 9/1956  | Reedy et al. ...................... | 137/318 |
| 2,899,983 | 8/1959  | Farris ................................ | 137/318 |
| 3,473,555 | 10/1969 | Martin et al. ..................... | 138/89  |
| 4,127,141 | 11/1978 | Ledonac et al. .................. | 138/89  |

*Primary Examiner*—Irwin C. Cohen
*Assistant Examiner*—G. L. Walton

[57] ABSTRACT

This invention relates to a pressure plug for sealing a service valve fitting aperture in a fully pressurized fluid transmission pipeline to enable service valve fittings to be replaced without interrupting the flow of fluid in the transmission pipeline.

The plug, which is located below an elongated main shaft, is comprised of spaced apart cap members having a compressible or resilient material there-between and an inner shaft extending longitudinally through the central axis of the plug so that when a nut associated with the inner shaft and plug is tightened it expands the plug making it larger in diameter than the service valve fitting aperture in the pressurized pipeline. The fluid pressure forces it against the inner wall of the pipeline, thus sealing the aperture.

1 Claim, 2 Drawing Figures

PRESSURE PLUG

BACKGROUND OF THE INVENTION

This invention relates to changing standard saddles or clamps used in securing a corporation stop or gate valve to a fully pressurized fluid transmission pipeline, for reasons of simplification the saddles, clamps, corporation stops and gate valves, hereinafter will be called service valve fittings.

A major application of this invention is the changing of service valve fittings. Because many of these fittings were made of highly corrosive material that disintegrate after prolonged usage. This disintegrating process causes fluid leaks that requires immediate attention. In addition the corrosive process also reduces the flow of fluid, by constricting the aperture in the service valve fitting.

The present procedure in changing service valve fittings on pressurized transmission pipelines has been to turn off the main transmission pipeline valves, which depressurizes the section of line where the service valve fitting needs to be replaced. This process requires time to notify the consumers, and time to turn the valves off and on.

Another problem with this procedure is the possibility of contaminating the depressurized section of the transmission line by creating a vacumn between the old service valve fitting aperture and any any other aperture in the transmission pipeline. An example of this would be a siphoning effect from any service valve connections elevated above the transmission main. Another problem can take place after replacing the service valve fitting and then turning on the transmission pipeline valves, the problem exists in the possibility of damaging the pipelines involved, by creating a fluid hammer.

SUMMARY OF THE INVENTION

The present invention relates to a novel expansible type stopper, hereinafter called a "pressure plug", which enables a service valve fitting aperture of a fluid carrying pipeline to be efficiently and rapidly plugged, without turning off the flow of fluid in the main transmission pipeline. The pressure plug can be used a multiplicity of times in making temporary closures of this nature. The pressure plug can be used in conjunction with numerous different sizes of plug assemblies.

The plug assembly is comprised of two spaced apart cap-like members having compressible or resilient material there-between, and with a shaft disposed along the central axis of the cap members, and resilient material, so that when a nut associated with the threaded end of the shaft is tightened, the resilient member is expanded larger than the service valve fitting aperture and thereby compressed tightly against the inner wall of the transmission pipeline by the force of the fluid pressure, thus precluding dislodgement of the plug assembly from the pipe. The nut, mentioned above, can be tightened or loosened in order to plug the transmission pipeline or to remove the plug, whichever may be the case.

An object of this invention is to provide a pressure plug to make a localized closure in a pressurized main transmission pipeline.

Another object of this invention is to change service valve fittings without interrupting the flow of fluid in the main transmission pipeline.

A further object of this invention is the convience of changing service valve fittings on a scheduled basis to delete possible expensive overtime work caused by leaks after business hours.

It is therefore a primary object of the present invention to provide a new way for effectively sealing an individual service valve fitting aperture in a transmission pipeline, so as to effect the fewest number of consumers in a fluid distribution system.

A still further object of the present invention would be to decrease the possibility of contaminating the transmission pipeline by low pressure feedback or syphoning in the section of pipeline being worked on.

Still another object of the present invention is to delete the danger of damaging the transmission pipeline by a possible fluid hammer.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed. Other objects of the present invention will become apparent to those skilled in the art as the description proceeds.

DETAILED DESCRIPTION OF THE DRAWINGS

Figure 2:
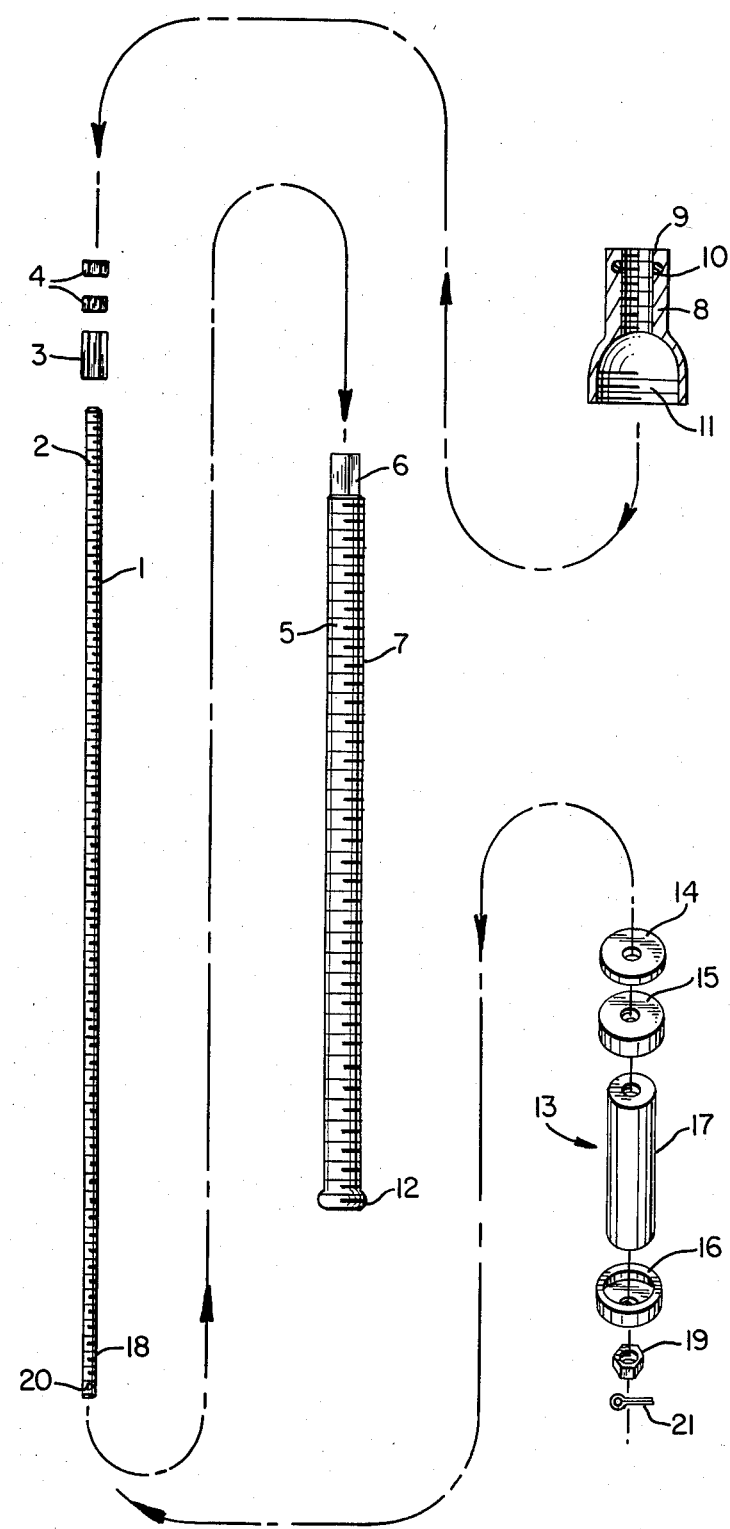
FIG. 2 is an exploded view of the pressure plug seen in FIG. 1, with some parts being broken away and shown in sections.
Figure 3:
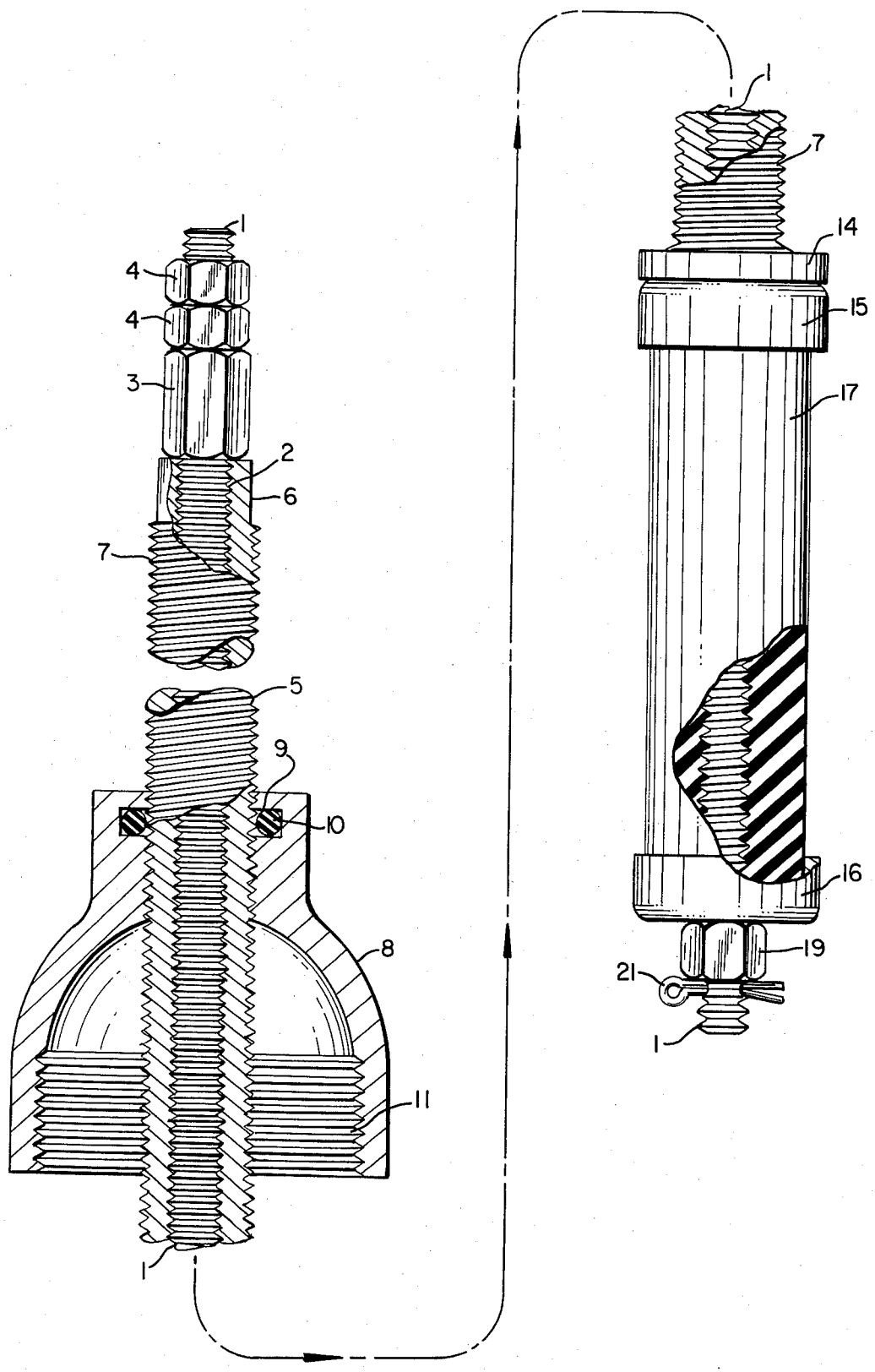
FIG. 3 is an elevational view of the pressure plug as shown in FIGS. 1 and 2 with the plug being shown in cross-section, while some parts of the plug are broken away to more clearly illustrate the details.

Illustrated in FIG. 2 is an exploded view of the pressure plug with some parts broken away and shown in section to better illustrate the details of the invention.

The cylindrical inner shaft 1 is threaded 2 on the top end to receive a threaded tightening nut 3, and two threaded holding nuts 4 that lock together to secure the inner shaft 1 from rotating while operating the tightening nut 3.

Figure 1:
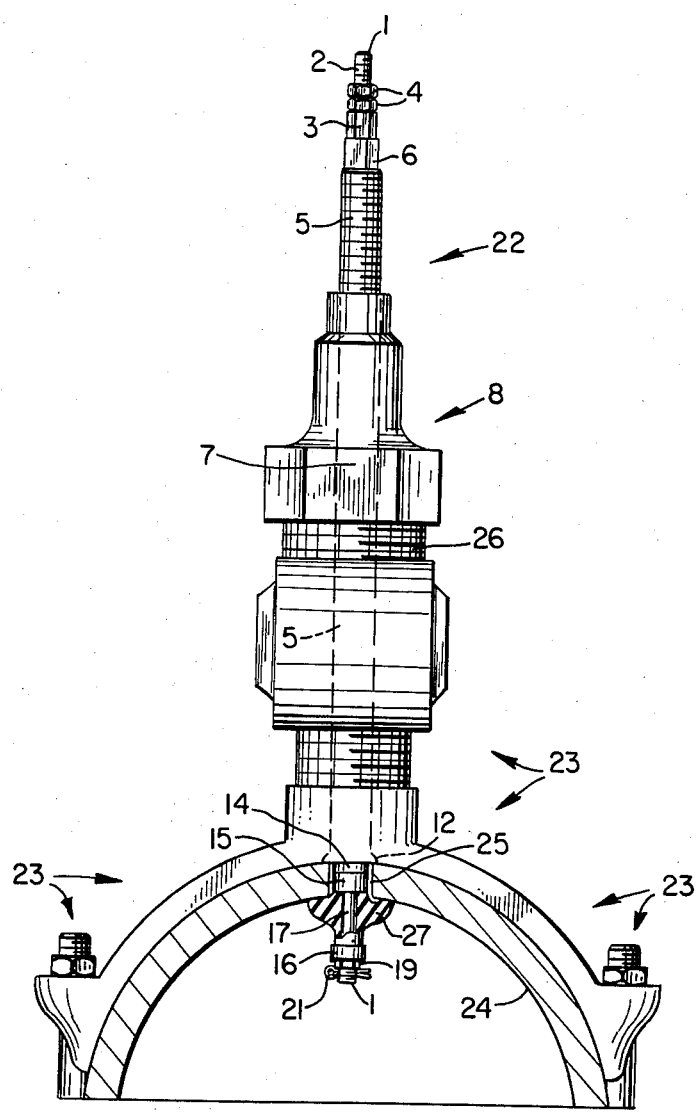
FIG. 1 is an elevated view of the pressure plug of the present invention with the plug being shown in its expanded position within the cross-section of a service valve fitting and fluid transmission pipeline.

The main shaft 5 which is a cylindrical tube, and which is of a size and configuration to enable it to slidably receive the inner shaft 1 there-through. At the upper end of the main shaft 5 is a wrench hold 6 which is used in operating the pressure plug. This wrench hold 6 is smaller in diameter than the main shaft 5. The main shaft 5 is threaded on its outer surface 7 to threadedly receive the main shaft guide 8, which resembles a flared tubing nut with a longitudinal aperture which is threaded in its inside upper section 9. The inside upper section 9, of the main shaft guide 8, has a groove to provide an area for packing with a standard elastomer o-ring 10. The bottom inside section of the longitudinal aperture in the main shaft guide 8 is threaded 11, to allow the main shaft guide 8 to be threadedly received by the threaded portion 26 of the service valve fitting, as seen in FIG. 1. The base of the main shaft 5 is slightly flared 12 to provide a stop, so the flare will deter the main shaft 5 from being entirely threaded out of the main shaft guide 8.

The elastomer plug assembly, generally indicated by the arrow at numeral 13 fits onto the bottom portion of the inner shaft 1 as indicated in FIG. 2. A elastomer seal 14 is provided for use as packing to prevent fluid from flowing into the main shaft 5 from the pressurized transmission pipeline. Spaced apart cap members 15 and 16 are disposed in face-to-face relationship with one another and are provided with a longitudinally extending inner shaft 1 centrally received therethrough. Between the two caps 15 and 16 there is a cylindrical elastomer plug 17, with a longitudinally inner shaft 1 centrally received therethrough.

The inner shaft 1, which is longer than the main shaft 5, is threaded at its bottom end 18 to threadedly receive a threaded nut 19 to hold the rubber plug assembly 13 in place. A horizontally centered aperture 20 is provided in the inner shaft 1 below the nut 19 for a locking pin 21, which keeps the threaded nut 19 from backing off of the inner shaft 1, when the pressure plug is in operation.

Illustrated in the FIG. 1 drawing is a pressure plug, in operation, generally indicated by the arrows at numeral 22, and the service valve fitting generally indicated by the arrows at numeral 23, which is connected to a fluid transmission pipeline 24. A service aperture 25 is provided in the fluid transmission pipeline, to supply fluids to distribution systems consumers.

In operation, with the inner and outer members being telescoped together as illustrated in FIG. 2 and with the plug made up with the resilient member sandwiched between the spaced apart cap members and with the main shaft guide screwed down the main shaft to its lowest extremity thereon, the main shaft guide is threaded onto the upper threaded section 26 of the service valve, which secures the pressure plug to the service valve. The service valve is then opened providing a longitudinal aperture through the service valve fitting and into the transmission pipeline. A wrench is secured to the wrench hold 6 on the pressure plug, by turning the wrench in a clockwise rotation it screws the main shaft downwardly through the main shaft guide into the longitudinal aperture in the service valve fittings and transmission pipeline. With the pressure plug assembly at its maximum depth or distance into the transmission pipeline determined by the length of the main shaft and the main shaft guide, the plug is expanded within the transmission pipeline. A wrench is used to secure the holding nuts 4 so that the inner shaft 1 will remain stationary while another wrench is used to thread the tightening nut 3 down the inner shaft 1, which pulls the inner shaft in an upward motion in reference to the main shaft. This action compresses each spaced apart cap member towards one another, thereby compressing the resilient material there between and outwardly forming a plug 27 larger in circumferance than the aperture 25 in the transmission pipeline. At this time, securing a wrench to wrench hold 6 and turning counter-clockwise, the main shaft is threaded upwardly until the enlarged rubber plug 27 comes in contact with the inner wall of the transmission pipeline blocking the aperture 25. The fluid pressure inside of the transmission pipeline provides an effective sealing force maintaining the plug 27 against the inner wall area around the aperture 25. At this time the main shaft guide 8 is threadedly removed from the service valve fitting section 26 and main shaft 5, to provide a clear pathway for removal of the old service valve fittings 23, which are replaced with new service valve fittings. Once the service valve fittings are replaced, the main shaft guide 8 is again threaded onto the main shaft and the service valve at 26. At this point a wrench is secured to the tightening nut 3 and rotated in a counter-clockwise direction to loosen the tightening nut associated with the inner shaft, whereupon the resilient material is uncompressed. By removing the wrench on tightening nut 3 and placing it on wrench hold 6, the main shaft 5 is then rotated in a counter-clockwise direction which draws the main shaft upward and out of the longitudinal aperture of the transmission pipeline and service valve fittings. The service valve 23, is closed after flare 12, of the main shaft 5, comes in contact with the upper inner wall of the main shaft guide 8. The pressure plug 22 is removed from the service valve by rotating the main shaft guide 8 in a counter-clockwise direction off of the service valve fittings.

The pressure plug can be used on a multiplicity of different diameter service valve fittings, so long as the main shaft guide and rubber plug are of the proper size. Substitution of different sizes of main shaft guides and rubber plugs is considered within the comprehension of the present invention.

While I have illustrated and described a preferred embodiment of my invention it is to be understood that such is merely illustrative and not restrictive and that variations and modifications may be made without departing from the spirit and scope of the invention. I therefore do not wish to be limited to the precise details set forth but desire to avail myself of such changes that fall within the preview of my invention.

I claim:

1. A pressure plug for shutting off pressure in a fluid transmission line as not to interrupt the flow through the main line, comprising of a main cylindrical outer tube externally threaded its full length having one end shaped to fit a wrench, the outer end flared outward, said wrench fitting having a maximum outside diameter less than the outside diameter of the main tube, an inner cylindrical rod, externally threaded at one end, to fit one or more locking and tightening nuts, said rod having a length greater than the outer tube and an outside diameter less than the inner diameter of the outer tube, a flared tubing nut main guide internally threaded at one end to fit the outer tube and internally threaded at the other end to receive a service valve fitting, said flared tubing nut main guide configured or grooved internally to accept a sealing ring, attached to the end of the inner rod opposite to the locking and tightening nuts an elastomer plug assembly capable of being expanded externally by compression, said elastomer plug assembly utilizing pressure in transmission pipeline sealing aperture in pipeline, said elastomer plug assembly consisting of a tube of elastomer material disposed between retainers on the end of the inner rod and an elastomer seal and retainers at the point of contact with the outer tube and elastomer plug assembly.

* * * * *